(12) United States Patent
Mayr (10) Patent No.: US 11,758,913 B2
(45) Date of Patent: Sep. 19, 2023

(54) PROCESS FOR PRESSING AND, IF NECESSARY, SLICING A LOAF AND SLICING MACHINE SUITABLE THEREFOR

(71) Applicant: TVI ENTWICKLUNG & PRODUKTION GMBH, Bruckmuehl (DE)

(72) Inventor: Martin Mayr, Eiselfing (DE)

(73) Assignee: TVI ENTWICKLUNG & PRODUKTION GMBH, Bruckmuehl (DE)

( * ) Notice: Subject to any disclaimer, the term of this patent is extended or adjusted under 35 U.S.C. 154(b) by 203 days.

(21) Appl. No.: 17/111,915

(22) Filed: Dec. 4, 2020

(65) Prior Publication Data

US 2021/0169091 A1 Jun. 10, 2021

(30) Foreign Application Priority Data

Dec. 4, 2019 (DE) .......................... 102019133068.8

(51) Int. Cl.
  *A22C 17/00* (2006.01)
  *A22C 7/00* (2006.01)

(52) U.S. Cl.
  CPC ........ *A22C 17/0086* (2013.01); *A22C 7/0023* (2013.01); *A22C 17/002* (2013.01); *A22C 17/0033* (2013.01)

(58) Field of Classification Search
  CPC .............. A22C 17/0086; A22C 17/002; A22C 17/0033; A22C 7/0023
  (Continued)

(56) References Cited

U.S. PATENT DOCUMENTS

| | | | | |
|---|---|---|---|---|
| 2011/0226101 A1* | 9/2011 | Völkl | .................. | B26D 1/28 83/176 |
| 2017/0312931 A1* | 11/2017 | Völkl | .................. | B26D 5/02 |
| 2019/0281843 A1 | 9/2019 | Voelkl et al. | | |

FOREIGN PATENT DOCUMENTS

| | | | | |
|---|---|---|---|---|
| DE | 3540904 C2 * | 8/1995 | ........... | A22C 7/0023 |
| DE | 102 20 006 A1 | 11/2003 | | |
| | (Continued) | | | |

OTHER PUBLICATIONS

EP 3238898 of Translation (Year: 2023).*
(Continued)

*Primary Examiner* — Nhat Chieu Q Do
(74) *Attorney, Agent, or Firm* — BROOKS KUSHMAN P.C.

(57) ABSTRACT

A method is provided of pressing an irregularly shaped, elongated loaf of an elastic material into a strand with a cross-section which is constant along its longitudinal extension. The method includes disposing the loaf in a form tube of the slicing machine, and determining basic data of the loaf before pressing, the basic data comprising at least physical basic data of the loaf before pressing. The method further includes determining a target length change of the loaf between an unpressed state and a pressed state, determining a target cross-sectional change of the loaf between the unpressed state and the pressed state, and pressing the loaf in the form tube in at least one cross direction to the longitudinal extension by a cross press stamp and in a longitudinal pressing direction of the form tube by a longitudinal press stamp, according to the target length change and the target cross-sectional change.

14 Claims, 9 Drawing Sheets

(58) Field of Classification Search
USPC .............................................................. 83/19
See application file for complete search history.

(56) References Cited

FOREIGN PATENT DOCUMENTS

| DE | 10 2004 041 915 A1 | 3/2006 | |
| DE | 102004041915 A1 * | 3/2006 | ........... B26D 7/0641 |
| DE | 10 2004 041 881 A1 | 10/2006 | |
| DE | 20 2011 110 800 U1 | 6/2016 | |
| DE | 10 2016 122 126 A1 | 11/2017 | |
| DE | 10 2018 106 300 A1 | 9/2019 | |
| DE | 10 2019 110 313 B3 | 7/2020 | |
| EP | 0419374 A1 * | 3/1991 | |
| EP | 3238898 A1 * | 11/2017 | ........... A22C 17/002 |
| WO | 2006/024469 A2 | 3/2006 | |

OTHER PUBLICATIONS

European Search Report dated May 12, 2021 (with English Machine Translation), Application No. 20205469.8-1005, Applicant TVI Enticklung Und Produktion Gmbh, 12 Pages.
German Search Report dated Oct. 2, 2020 (with English Machine Translation), Application No. 10 2019 133 068.8, Applicant TVI Enticklung Und Produktion Gmbh, 14 Pages.

* cited by examiner

PROCESS FOR PRESSING AND, IF NECESSARY, SLICING A LOAF AND SLICING MACHINE SUITABLE THEREFOR

CROSS-REFERENCE TO RELATED APPLICATIONS

This application claims priority to German Patent Application No. 102019133068.8 filed Dec. 4, 2019, the disclosure of which is incorporated in its entirety by reference herein.

TECHNICAL FIELD

The invention relates to the pressing and subsequent slicing of an initially irregularly shaped loaf of particularly elastic material, such as a grown piece of meat, into slices, in particular of precise weight.

BACKGROUND

The production of weight-precise slices or portions from an elastic strand is relatively problem-free if this strand has the same cross-section along its length and consists of a homogeneous material that is equally easy to cut everywhere, such as an industrially produced sausage strand or cheese strand.

So-called slicers are known for that, which usually cut slices with a round or sickle-shaped rotating blade whose cutting edge extends along the outer edge, while the strand that is usually exposed in the process is either only moved in between or continuously forward.

However, a grown piece of meat does not have these characteristics, because each of these loaves has a different design and, in addition, a cross-section that changes over its length. It can also consist of materials of different consistency, hardness and elasticity, for example, the fat content, the pure muscle meat, the surrounding silver skin and, if necessary, bones like a piece of cutlet.

In this context, it is already known to first deform such a loaf so that it has a defined, known cross-section, at least at the end where the next slice is cut, preferably the same cross-section over the entire length, i.e. as a strand.

Then a relation between the adjustable thickness of the slice and the weight of the slice can be established by means of the known cross section as well as the estimable specific weight, although not exactly, since from one slice to the next the composition of the loaf can change and its components can have different specific weights.

In order to achieve this deformation into a strand, the—usually slightly frozen—loaf is first placed in a form tube which has a constant free inner cross-section over its longitudinal extension. Then the loaf is pressed against a stop in the forming tube, at least in the axial direction of the forming tube, by means of a longitudinal press stamp, so that the loaf expands in its cross-section in such a way that it fills the entire inner free space of the forming tube, which has the same cross-section over its entire length, and thus adopts its cross-section over the entire length.

Form tubes with different cross sections can be used, depending on the dimensions of the loaf, and the cross section of the form tube can also be changed after insertion of the loaf, for example by moving two opposite sections of the circumferential wall of the form tube towards each other, so that one of the sections can then act as a cross-pressing stamp and thus also effect cross-pressing of the loaf.

If a loaf is pressed exclusively in longitudinal direction, especially a loaf with a cross section that varies greatly over the length, the loaf can have a wrinkled narrow end and/or the structure of the material of the loaf can be changed negatively, especially unwanted cracks in the structure can be caused.

Therefore, the combination of longitudinal pressing and cross pressing is known to be more gentle, especially if cross pressing is carried out in two different cross directions.

However, it is also known that depending on the sequence and extent of longitudinal pressing and cross pressing relative to each other, further problems can arise, such as strong adhesion of the loaf to the circumferential walls if longitudinal pressing is carried out in an already transversely compressed state or insufficient transmission of the longitudinal pressing force from the longitudinal pressing stamp at the rear end to the front end of the loaf to be compressed.

SUMMARY

It is therefore the object of the present invention to carry out the pressing for the material of the loaf to be pressed as gently as possible in the case of both longitudinal pressing, i.e. in the direction of the greatest extension of the loaf, and cross pressing, in particular if the loaf pressed into a strand is subsequently cut.

It is also the object to provide a suitable slicing machine for this purpose.

With regard to the process, this object is solved by specifying a target range for the length change of the loaf during pressing and the target length change should not be exceeded during pressing.

Depending on the target length change, the degree of influence on the cross section of the loaf in the crossdirection is determined, usually automatically, or by an operator, in order to produce a strand with a constant cross-section over the length of the loaf.

For this purpose, before the pressing of the loaf, at least some basic physical data of this loaf are automatically determined by a machine used for this purpose, in particular a slicing machine, or entered by the operator via an input unit, which at least partly serve to determine this target length change depending on this.

The basic physical data of the loaf which are determined, are at least the length of the loaf in the longitudinal pressing direction, i.e. if the loaf is arranged with its largest extension in the longitudinal pressing direction, as well as the weight or alternatively the volume of the loaf, which can be converted into each other with the help of the usually known specific weight of the material of the loaf.

The length of the loaf in the unpressed state should be determined in order to be able to compare the length of the loaf with the state pressed into a strand with a cross-section that remains constant over the length and thus to be able to determine the actual length change and its conformity with the desired target length change.

Preferably, the largest cross-section of the loaf in its unpressed initial state is also determined, because the degree of slenderness can then be determined in comparison to its length and volume. This is also an important parameter for how much the target length change may be without, for example, a creasing of the narrow end of the loaf.

Further physical basic data can be material data, for example the elasticity and/or the plasticity and/or the liquid content of the material, and/or state data of the material such as its frost state, for example described in terms of surface temperature and frost depth, i.e. for example the temperature decrease in depth direction or the temperature measured at a defined depth from the surface.

This is because the loafs to be pressed are usually lightly frozen beforehand, i.e. they are frozen in their outer areas, but not in the core, in order to facilitate immediate slicing and to prevent the loaf from sticking to adjacent components during pressing, for example the circumferential surfaces of a form tube described below.

In addition, non-physical basic data can also be collected, which, however, are primarily entered by the operator via an input unit in the control system, for example the basic type of material of the loaf, for example fish, meat or another foodstuff, and in the case of a grown piece of meat, of course the animal species and the place of origin of the piece of meat in the animal.

The pressing in longitudinal direction and also the influencing of the cross section of the loaf in cross direction, i.e. with regard to its cross-section, are generally carried out by means of a form tube open at both ends, which has a constant cross-section over its longitudinal extension, the longitudinal direction.

In this case longitudinal pressing is carried out by means of a longitudinal press stamp, which can be inserted and moved in the form tube and can be loaded with a desired pressing force.

The constant cross section of the form tube is variable in that a crosspress stamp, which can also be subjected to a pressing force and forms part of the circumferential wall, can be retracted to a greater or lesser extent into a form tube channel of approximately U-shaped cross section.

This allows cross pressing in at least one of the cross directions to the longitudinal direction by reducing the original maximum cross-section of the, for example, pear-shaped loaf, which would naturally increase its length if longitudinal pressing would not carried out at the same time.

However, one of the press stamps can also serve only as a stop for the loaf to be pressed, which also influences the dimensions of the loaf in this direction:

For example, in the case of a very long and slim loaf whose differences in cross-section along its length are relatively small, the longitudinal press stamp can be set to a position spaced from one end of the unpressed loaf in the forming tube.

During the subsequent cross pressing process, the length of this slim loaf increases and one end face of the loaf is pressed against the positioned longitudinal press stamp, again with the aim of producing a strand of the irregular loaf with a cross-section that remains constant over its length.

Irrespective of whether the dimension of the loaf is reduced or even increased in one of the directions, for the purposes of the present application this operation is referred to as pressing.

While the longitudinal press stamp is usually force-controlled, the cross press stamp is often position-controlled.

In order to reduce the complexity of the longitudinal stamp, a maximum of 10, better only 5, better only 3 cross positions for the cross stamp are available for selection.

In order to preserve the structure of the loaf, the target length change is usually specified in a range between −30% and +10%, starting from the unpressed length, as it has been shown that in this range a length change does not yet have too strong negative influence on the structure of the loaf.

The target length change can therefore also be a positive value, for example, if the loaf is very long compared to its cross-section and its unpressed length is at least 5 times, or better at least 10 times the greatest thickness in the unpressed state.

So the change in longitudinal and cross direction, thus concerning length and maximum diameter, is a negative value in one dimension and a positive value in the other, or a negative value in both dimensions.

Preferably, the pressed state is at the same time a so-called measuring state, in which the length of the loaf pressed into a strand is measured via the position of the longitudinal press stamp and, on the basis of the known, selected or measured, cross position of the cross press stamp, the cross-sectional surface of the form tube and, via this, the volume of the cavity of the form tube between the stop plate—usually present at the front end of the form tube—and the longitudinal press stamp in its pressing position.

On the one hand, by comparison with the weight or volume determined prior to pressing, a deviation can be determined which indicates the extent to which the strand actually fills the cavity in the forming tube, i.e. whether the forming into a strand with a cross-section that is constant over the entire length has been completed. On the other hand, this length is usually used for subsequent slicing—which is preferably also carried out while the force-controlled stamps are under the measuring force as it is in the measuring condition—to determine the slice thickness.

However, the feed force applied to the longitudinal stamp to push the strand forward between the cutting of the individual slices does not necessarily have to be the measuring force, but a force higher or lower than the measuring force can be sufficient for this purpose. Since the forward pushing should be as fast as possible, a force is usually applied to the longitudinal stamp which is the maximum force of the longitudinal stamp or at least comes very close to it, i.e. at least 80%, better 90% of the maximum force.

Normally after the described pressing of the loaf, it is sliced in the pressed state and usually in the same machine into slices—preferably of exact weight—for which purpose the strand is pushed forward in the longitudinal pressing direction beyond the front cutting end of the form tube by a defined overhang, usually until it comes to rest against a stop plate, the distance of which can be adjusted to the front end of the forming tube, the cutting end.

Then a slice is cut off by means of a blade which moves in cross direction in a blade plane just in front of the front cutting end of the form tube.

Preferably, the pressed state, for which the target length change of the loaf should apply, is at the same time the slicing state, in which the loaf is cut into slices.

The pressing forces applied to the individual press stamps in the pressed state in which the desired length change is to be achieved are therefore also present in the slicing state.

A variant of pressing that causes particularly little damage to the structure consists of carrying out cross pressing not only in one, but in two different, preferably perpendicular, cross directions to the longitudinal direction.

For the second cross press stamp—one of the two cross press stamps is almost always position-controlled in order to keep the complexity of the longitudinal press stamp within limits—the cross press stamp position for the pressed state is preferably determined automatically as specified for the first cross press stamp.

With regard to a slicing machine suitable for carrying out this process, such a slicing machine first of all comprises the generic features of a form tube extending in the axial direction and open at both ends, as well as a longitudinal press stamp which fits exactly into it and can be moved in it, which can be introduced from the rear loading end and can be loaded with pressing force.

Furthermore, at least one cross press stamp acting in at least one of the cross directions is present as part of the circumferential wall of the form tube, wherein each of the cross press stamps can be acted upon by a pressing force, wherein in particular the pressing forces of the individual press stamps can be controlled independently of one another.

Furthermore, such a slicing machine requires a blade to separate the slices from the meat strand, which is located in front of the front cutting end of the form tube, preferably movable in cross direction.

The object according to the invention is solved by the fact that the slicing machine comprises a basic data measuring device which is capable of automatically determining the basic data to be measured of the unpressed loaf, as explained by the method.

This basic data measuring device thus comprises at least one length measuring device capable of measuring the length of the loaf in the unpressed state, but preferably also in the pressed state. The actual length change can be determined from the difference and checked whether it corresponds to the set target length change.

Furthermore, the slicing machine includes a cross positioning device that is capable of automatically approaching a predetermined cross position with the cross press stamp.

Accordingly, such a slicing machine also requires a control system that is able to automatically determine a set cross position for the cross press stamp from determined basic data of the loaf and/or entered basic data of the loaf and to control the corresponding press stamp drives.

To enable the operator to enter basic data, the slicing machine also includes an input unit.

Preferably the basic data measuring device comprises
a weight measuring device to determine the weight of the loaf and/or
a volume measuring device to determine the volume of the loaf, in particular a non-contact, preferably optical, scanning device, with which not only the volume but also the shape and thus the overall dimensions of the loaf can be determined and/or
a temperature measuring device to automatically determine the temperature of the loaf at least on its outer surface.

As explained above, the basic data determined with such measuring devices enable or facilitate the determination of the cross position of the press stamp in order to achieve the desired target length change.

Preferably, a slicing machine according to the invention also includes a loaf feeding device upstream of the form tube, such as a conveyor belt, whereby the basic data measuring device can then—at least partially—be present at this loaf feeding device.

For example, the loaf feeding device can be equipped with an axially effective loaf stop which can be deactivated and against which the loaf is moved. A measuring device is then used to measure the position of its rear end facing away from the loaf stop and based thereon the length of the loaf in the unpressed state in a simple manner.

For crosspressing in two cross directions, the form tube often consists of a U-shaped form tube channel whose side walls can be moved towards each other so that one of them forms the one cross press stamps.

The distance between the two side walls for the pressing after the loaf has been inserted is either always pushed together to the same final dimension or one of a few final dimensions, and then the other cross press stamp, whose width corresponds to the set width of the opening of the form tube channel, is inserted into the interior of the form tube channel from the open side of the form tube channel, so that a circumferentially closed form tube cross-section is formed.

BRIEF DESCRIPTION OF THE DRAWINGS

Embodiments according to the invention are described in more detail below as examples, with reference to the following drawings which show.

DETAILED DESCRIPTION

Figure 1A:
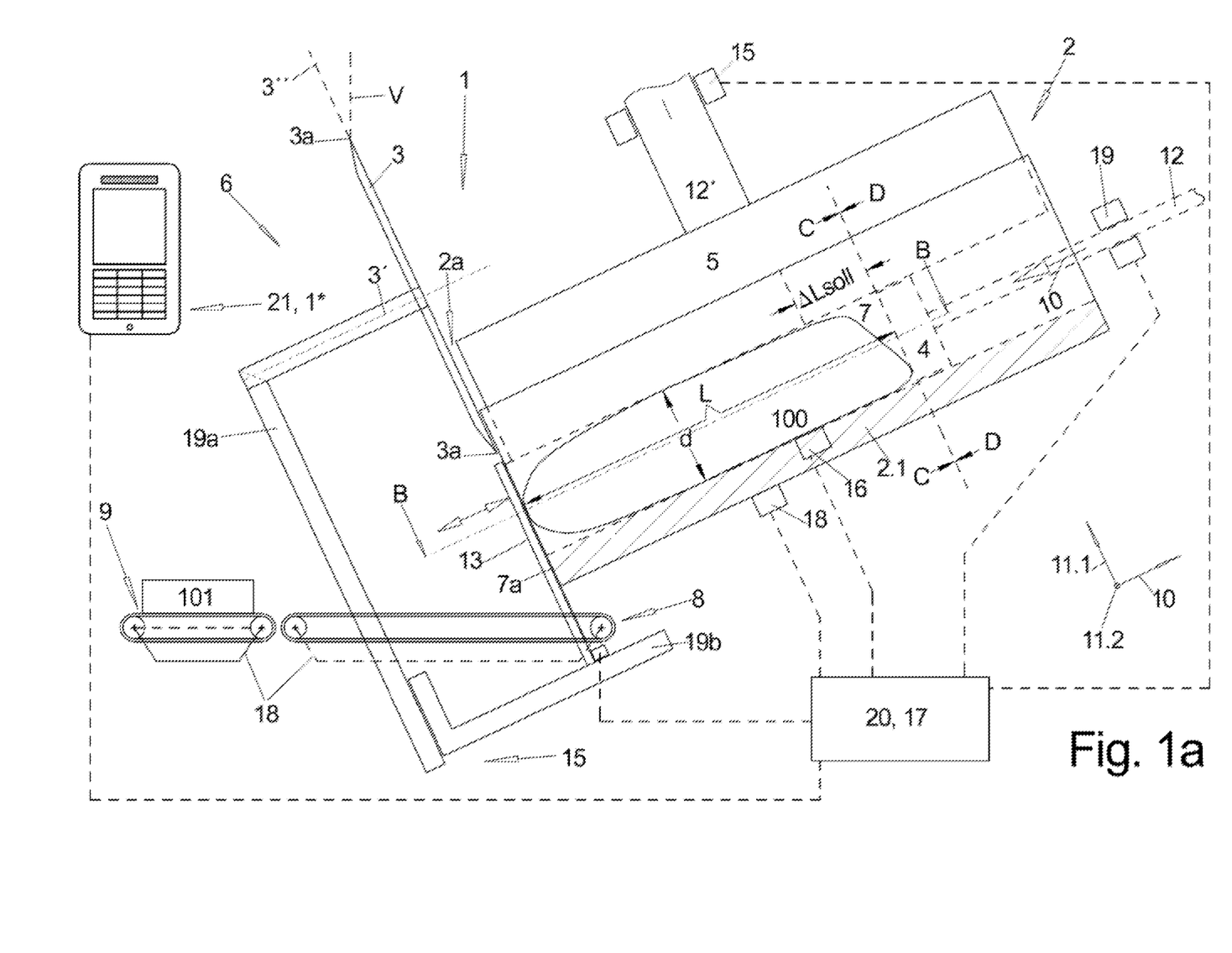
FIGS. 1*a*, *b*: a slicing machine for pressing and slicing loaves in side view in different functional positions during pressing.
Figure 1B:
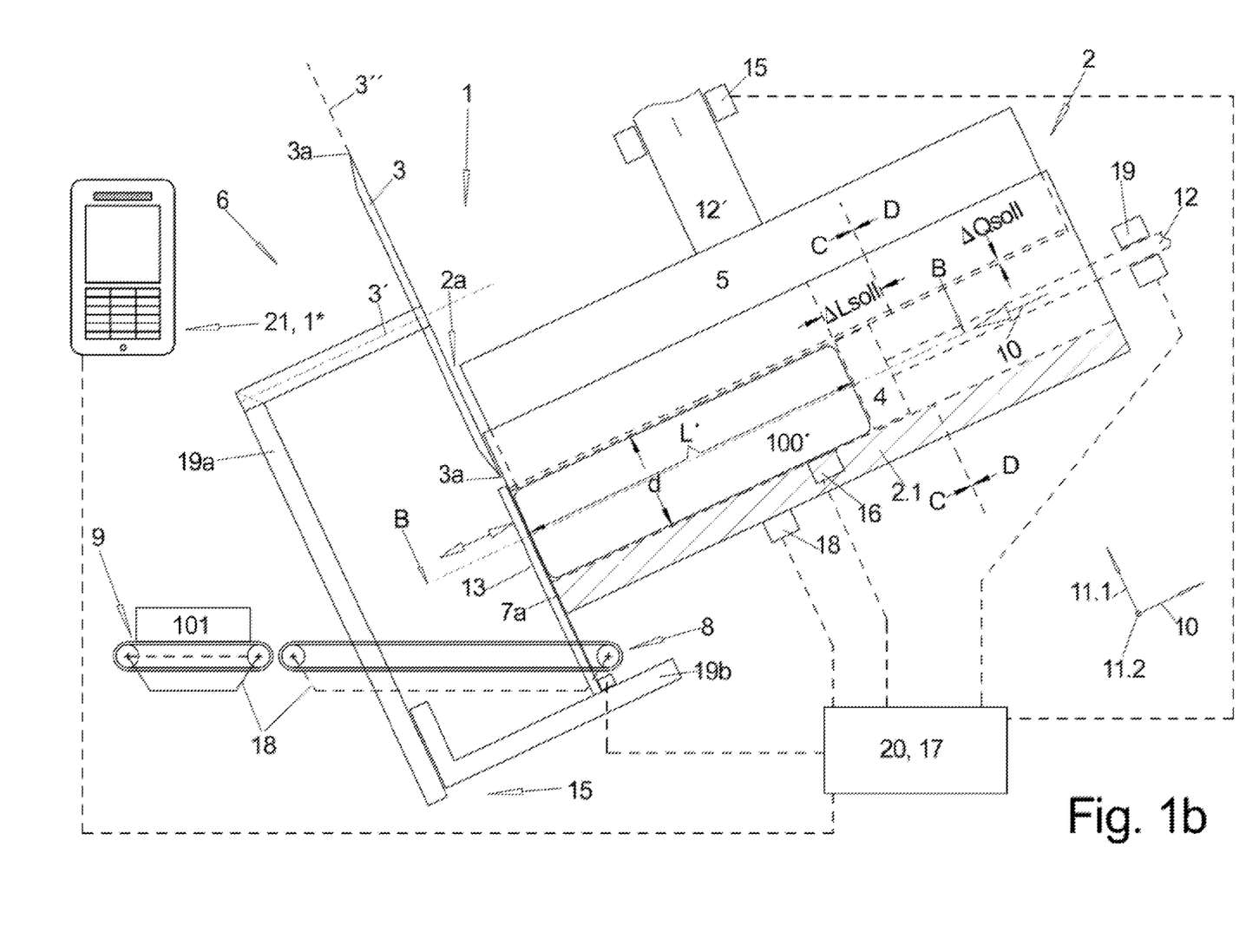

FIGS. 1 and 2 show—cut along the longitudinal pressing direction 10—the entire cutting machine 1, which, apart from the form tube 2 and the pressing stamps 4, 5, comprises a cutting unit 6 for separating slices 101 from the pressed loaf 100, the strand 100'.

With regard to the form tube 2, it can be seen that the form tube 2 is arranged inclined forward, i.e. towards the cutting unit 6 downwards.

Figure 3A:
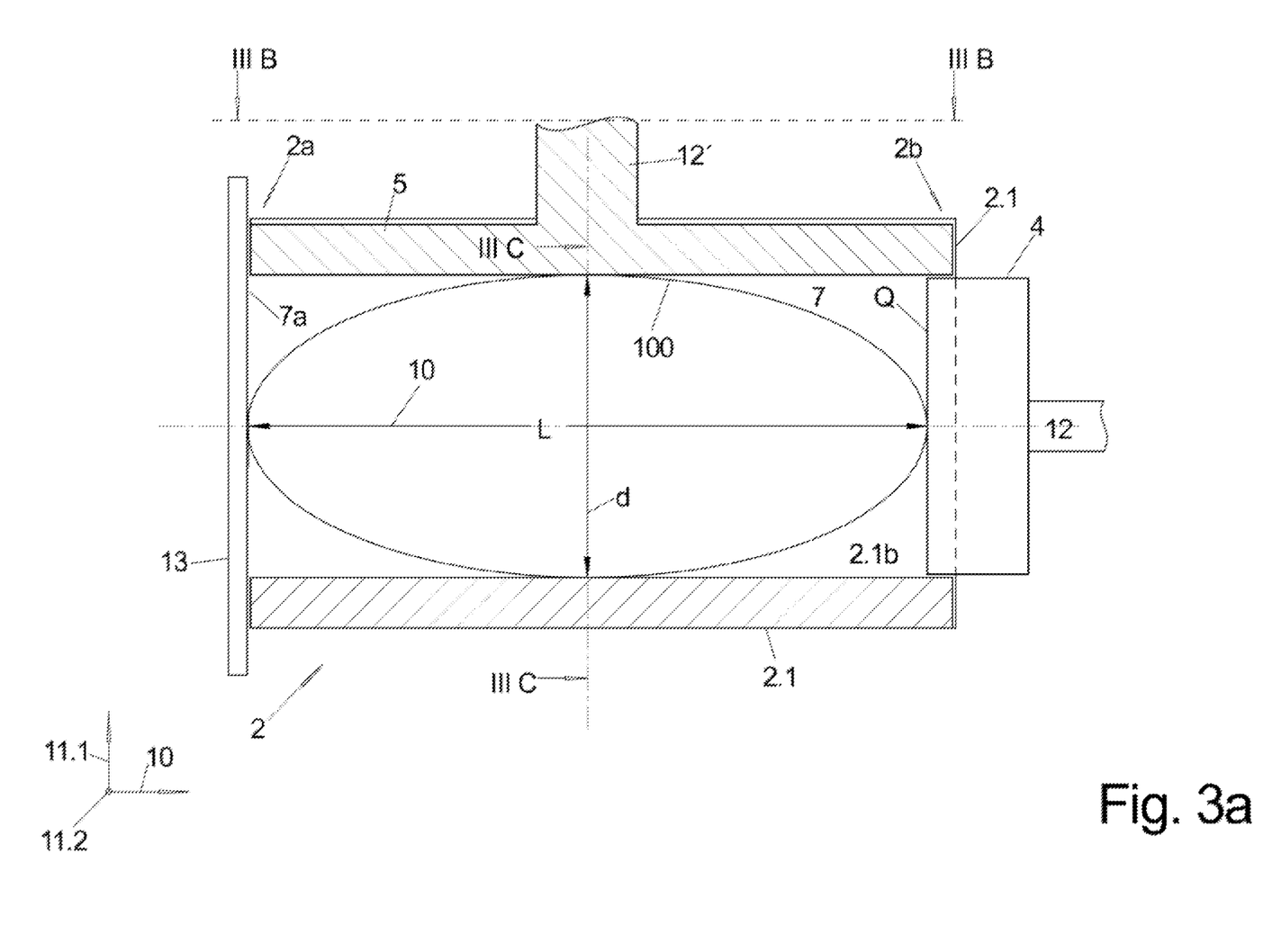
FIG. 3*a*: a form tube in side view in section.
Figure 3B:
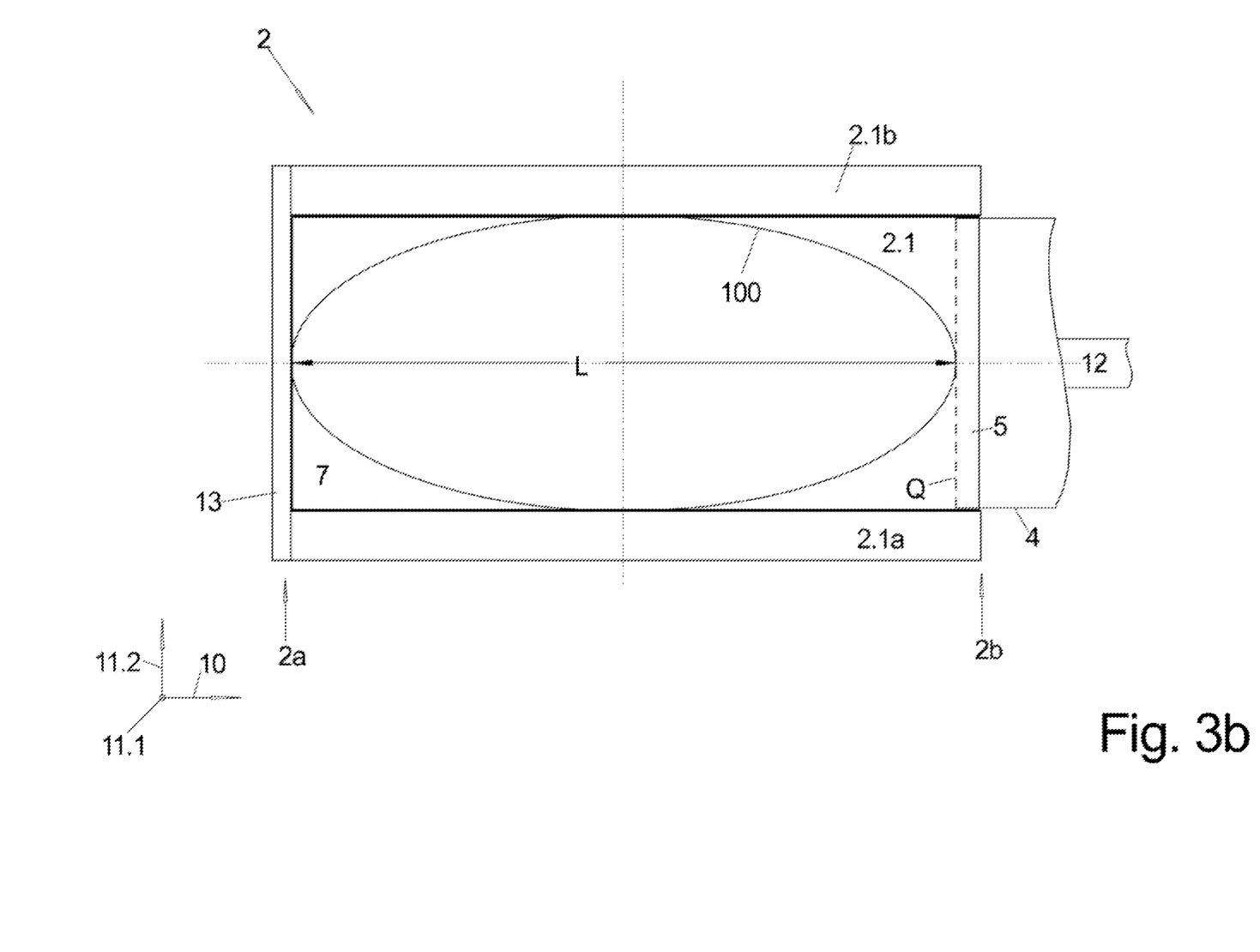
FIG. 3*b*: the form tube cut along the line B-B of FIG. 1*a*, FIG. 3*c*: the form tube cut along the line C-C of FIG. 1*a*, FIG. 4: a section through another design of the form tube along the line D-D of FIG. 1*a*.
Figure 3C:
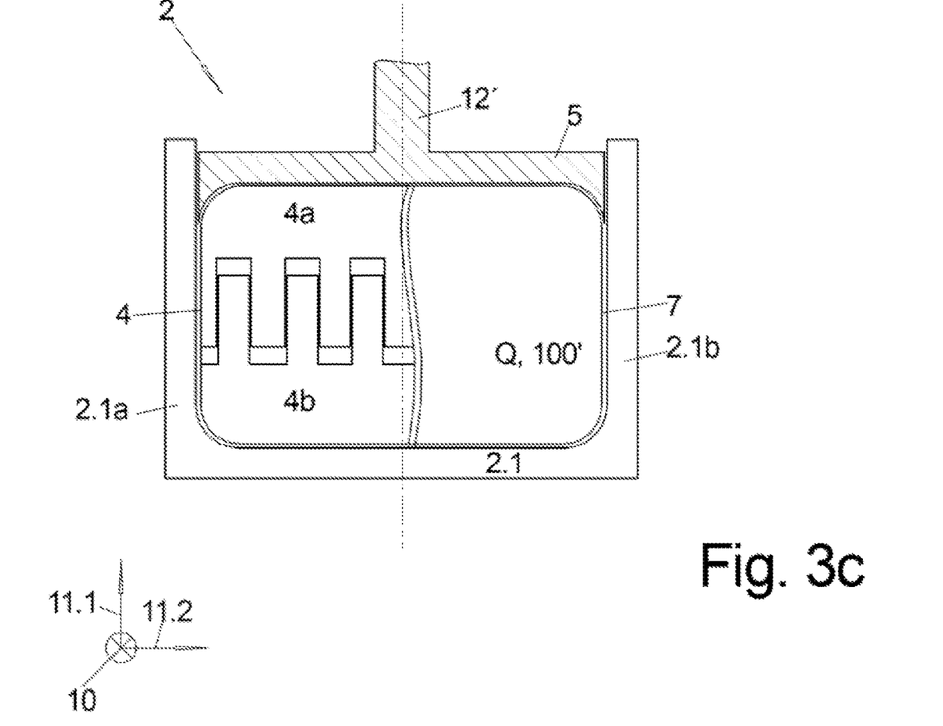

The form tube 2 is formed by a cross-sectionally U-shaped form channel 2.1 with walls 2.1*a, b* of the channel cavity extending parallel to each other and a cross-press stamp 5 which fits exactly into this open side of the form channel 2.1, as can be seen more clearly in FIGS. 3*a* and 3*b* and especially FIG. 3*c*.

FIG. 3*c* also shows that the longitudinal press stamp 4, which is to be movable in the longitudinal direction 10 in the form tube cavity 7, must normally have a variable size in one dimension, namely the plunging direction 11.1 of the cross press stamp 5, and therefore usually consists of two parts 4*a* and 4*b*, for example, interlocking like tines.

Figure 4:
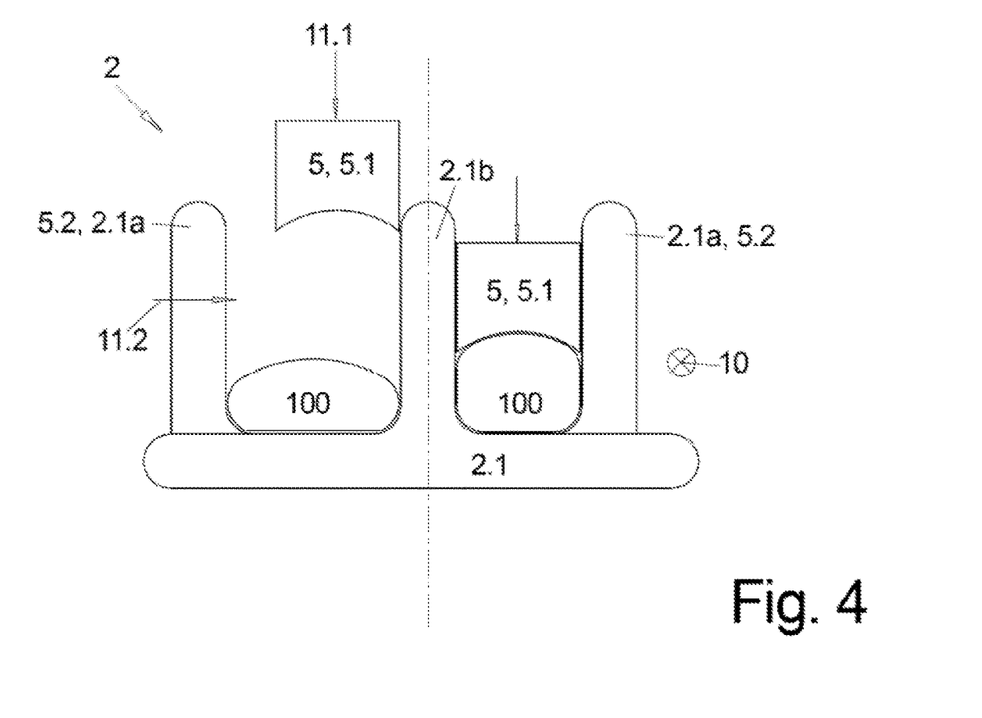

FIG. 4 also shows that on the one hand—in the viewing direction of FIGS. 1 and 2—there can also be two, preferably identical, form tube channels 2.1 behind each other, i.e. next to each other.

FIG. 4 further shows that the cross-sectionally U-shaped form channel 2.1 need not have a fixed width, but that the width of its interior space can be adjusted by varying the distance between one of the side walls 2.1*a* of the forming channel 2.1 and the opposite wall 2.1*b*, in particular by adjusting it to one or more set positions, preferably to the distance corresponding to the width of the cross press stamp 5.

If this movable side wall 2.1*a* can be subjected to force, it acts as a second cross press stamp 5.2 in addition to the existing cross press stamp 5, which is then the first cross press stamp 5.1.

However, moving apart to a larger distance facilitates, above all, the insertion of the loaf 100 into the form channel 2.1.

FIG. 3*a* shows in this context that because of the preferably force-controlled cross press stamp 5, the longitudinal press stamp 4 must in any case be variable in its extension at least in the cross pressing direction 11.1, as shown in FIG. 3*c*.

Figure 2A:
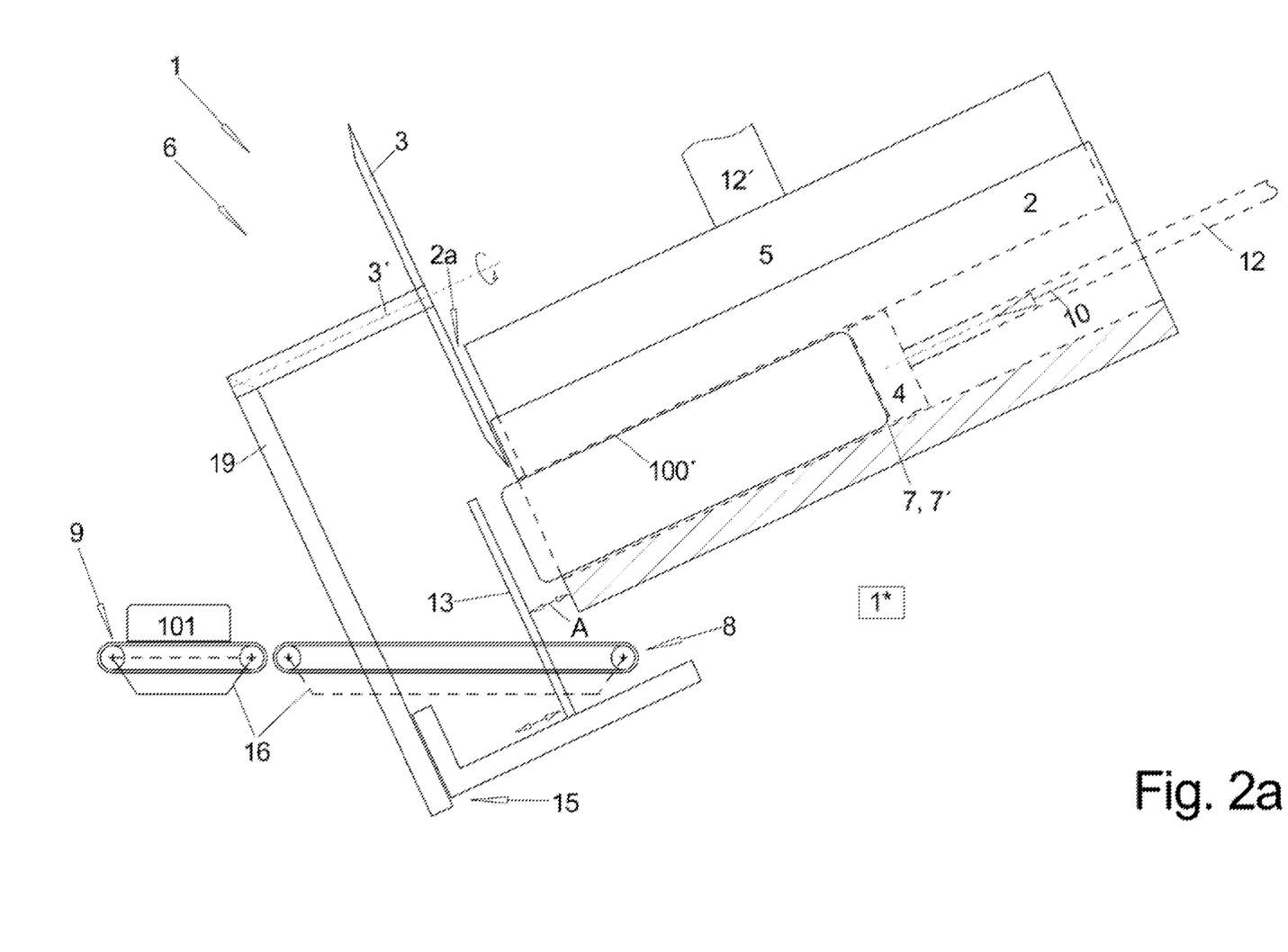
FIGS. 2*a-d*: the slicing machine of FIGS. 1*a* and 1*b* in side view in different functional positions during slicing.
Figure 2B:
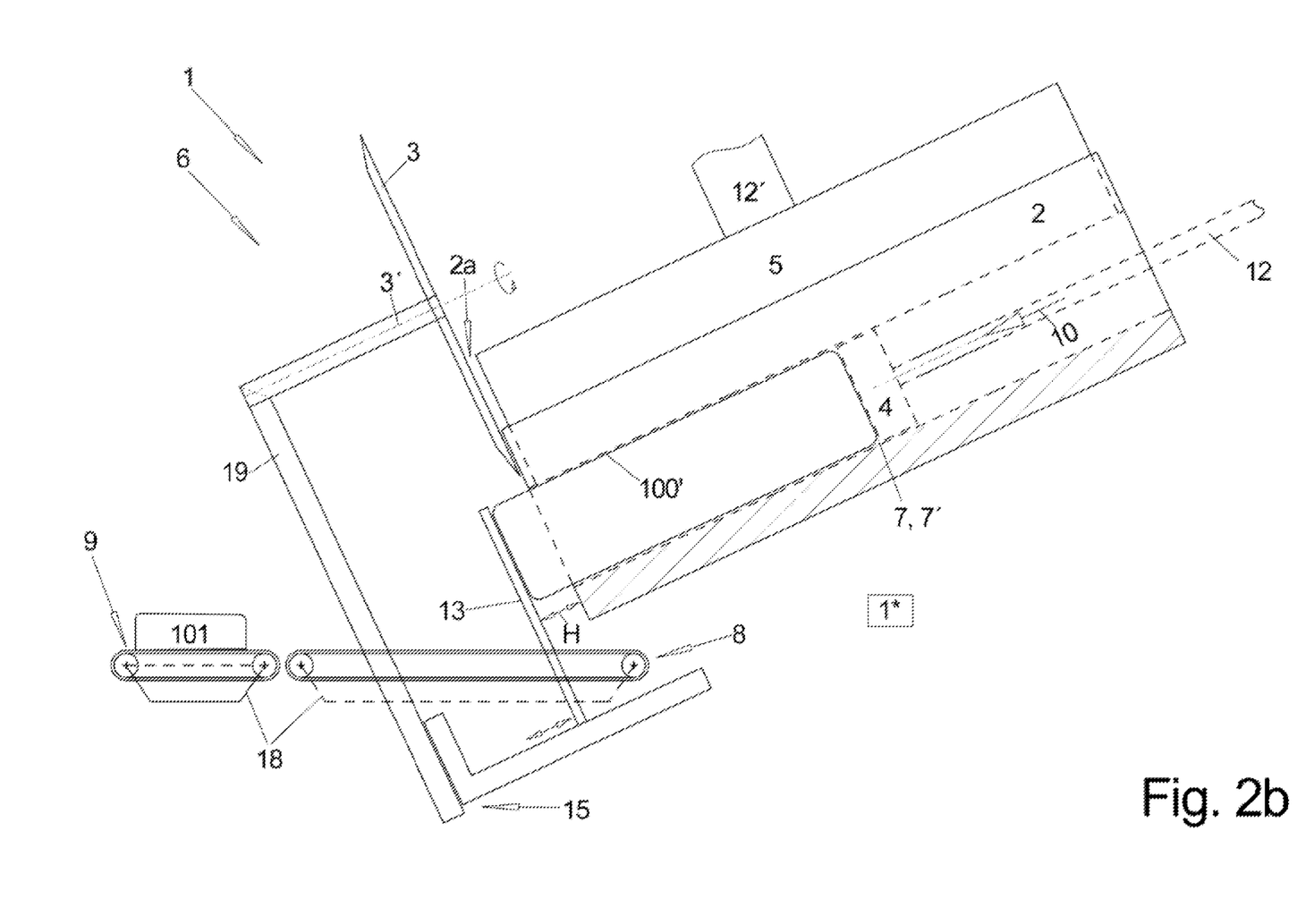
Figure 2C:
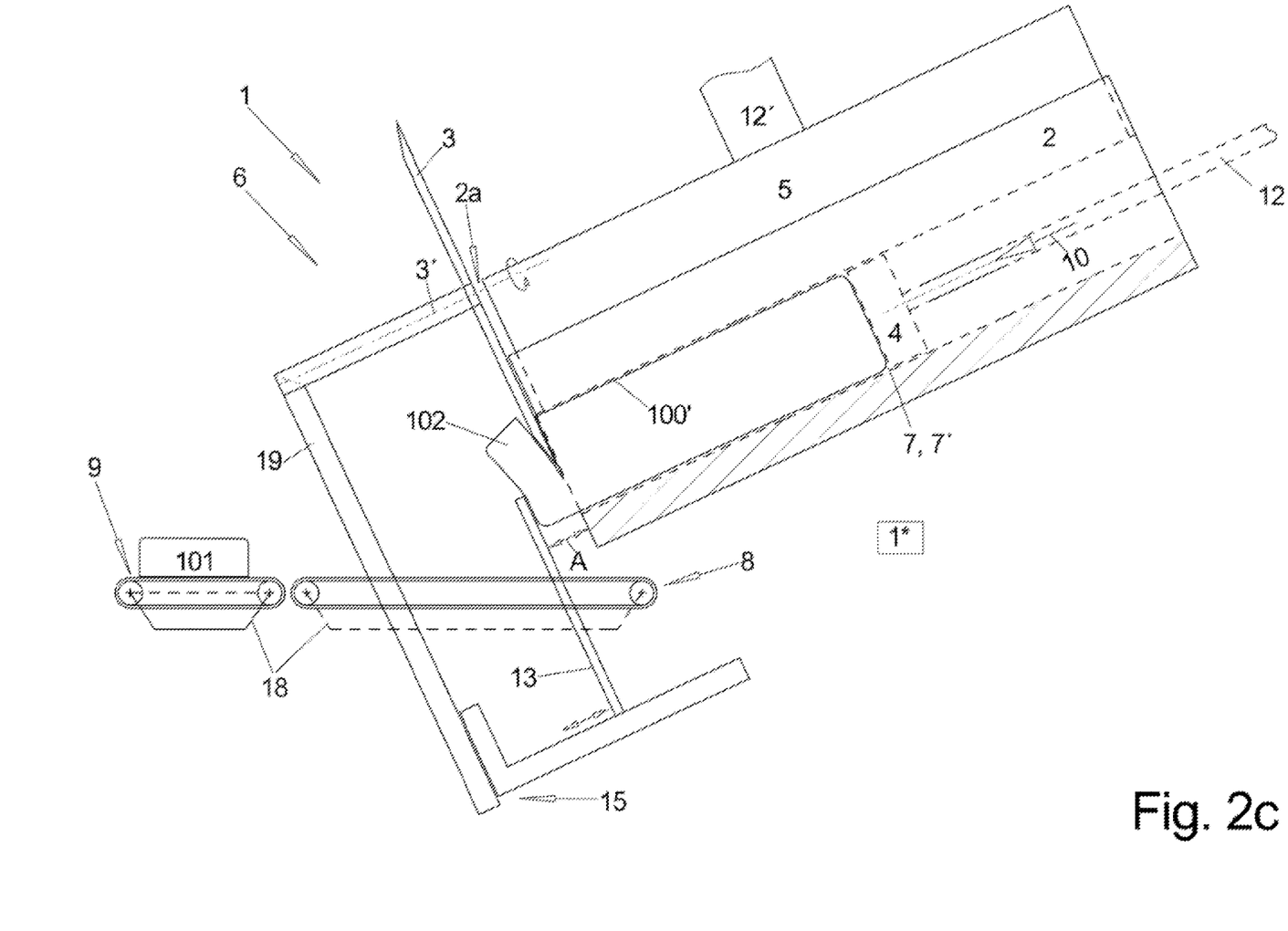

In the longitudinal direction 10 in front of the cutting end 2*a* of the form tube 2, there is a stop plate 13, which can be adjusted in its axial distance to the cutting end 2a—as shown in FIG. 2a—or can be placed directly against the cutting end 2a of the form tube 2, covering the front form tube opening, as a loaf stop 13, as shown in FIG. 1a.

The cutting unit 6 comprises a circular disk-shaped blade 3 rotating about a blade axis 3' located above the form tube cavity 7 parallel to the longitudinal direction 10 and having a cutting edge 3a at its circumference, which can be moved back and forth in a 1st cross direction 11.1 with its blade plane 3" defined by the rotating cutting edge 3a just in front of the cutting end 2a of the form tube 2.

Figure 2D:
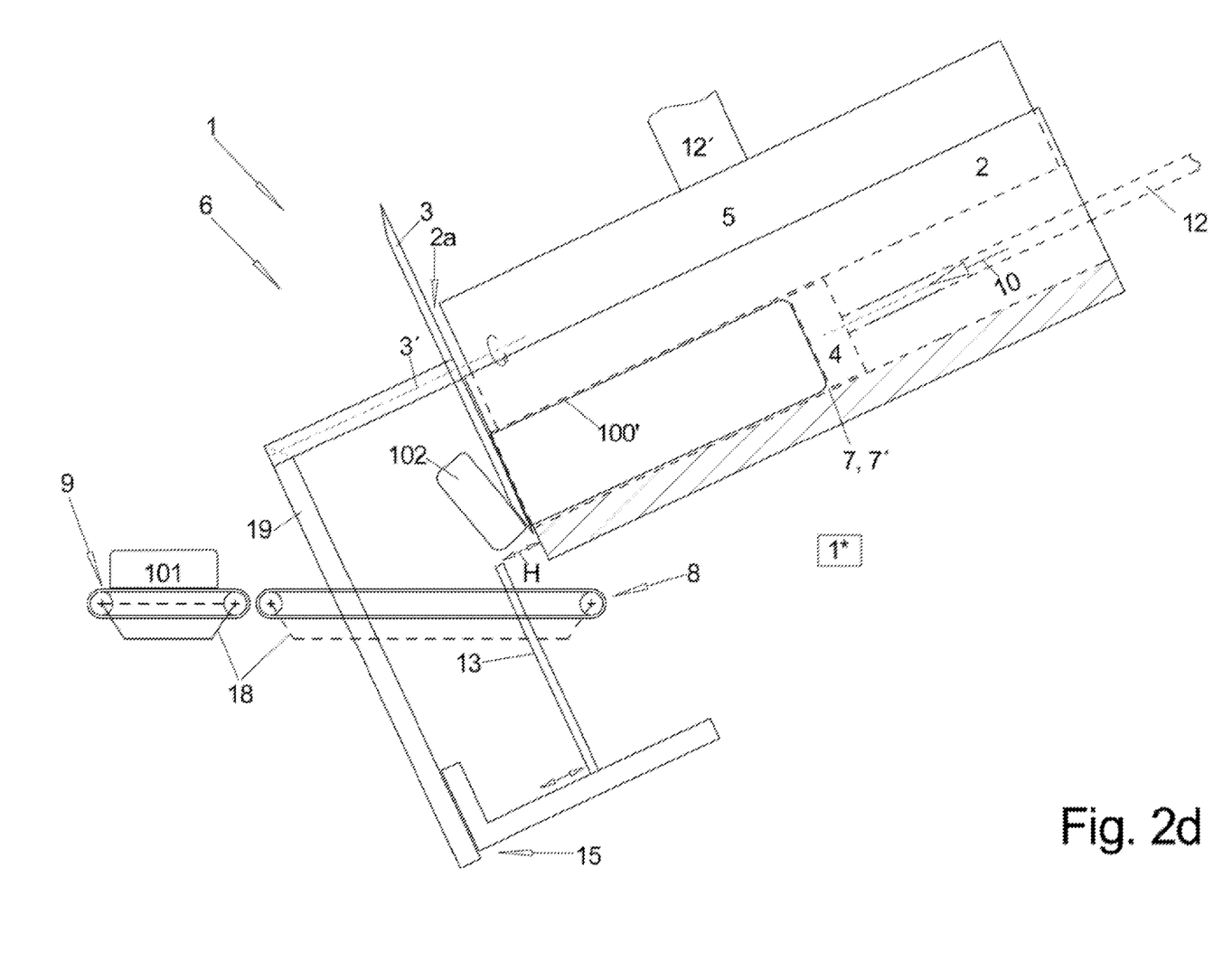

The cutting edge 3a runs along the lower front opening of the form tube 2 and separates a slice 102 from a protruding loaf 100 or strand 100', as shown in FIG. 2d.

The slicing machine 1 also includes a basic data measuring device 20, with which some basic physical data can be determined automatically by the machine.

A length measuring device 19 can, for example, be arranged at the piston rod 12 of the longitudinal press stamp 4 and detect the respective longitudinal position of the longitudinal press stamp 4.

Similarly, a thickness measuring device 15 can be present at the piston rod 12' of the cross press stamp 5, which detects the position of the cross press stamp 5 in its direction of movement, here the 1st cross direction 11.1, whereby this direction of movement 11.1 of the cross press stamp 5 does not necessarily have to coincide with the direction of movement of the blade axis 3'.

If the unpressed, but usually frozen on the outside, loaf 100 lies in the form tube channel 2.1 and the stop plate 13 is placed as loaf stop at the front opening 7a of the form tube cavity 7, covering the cutting end 2a of the form tube 2, the longitudinal press stamp 4 can be placed at the rear end of the loaf 100 and the length L of the loaf 100 can be determined from its longitudinal position, as shown in FIG. 1a and FIGS. 3a and 3b.

Furthermore, by placing the cross press stamp 5 on the loaf 100, the cross position of the cross press stamp 5 and the current maximum thickness d of the loaf 100 in this first cross direction 11.1 can be determined, as also shown in FIG. 1a and FIGS. 3a and 3b.

For the measurement in the unpressed initial state, the corresponding stamp 4, 5 should rest on the loaf 100 with as little force as possible, e.g. only with its own weight and without additional force applied by the stamp drive.

In addition, the weight of the loaf 100 can be determined by means of a weight measuring device 18, which can, for example, be arranged at the form tube 2.

The control 1* of the slicing machine 1, which is signally connected to the basic data measuring device 20, can—knowing the specific weight of the loaf 100, which is usually entered by the operator—determine the size of the cavities in the form tube 2 around the loaf 100 between the loaf stop 13 and the longitudinal press stamp 4 and, on the basis of this basic data and/or further basic data entered by the operator via an input unit 21, determine a target length change $\Delta L_{target}$ by which the loaf 100 should be shortened when pressing it into a strand 100'.

Furthermore, the control 1* determines the required crossposition of the crosspress stamp 5 from this target length change $\Delta L_{target}$, and controls the crosspress stamp drive—not shown—accordingly, before or simultaneously with the forward movement of the longitudinal press stamp 4 by means of the likewise not shown longitudinal press stamp drive, also controlled by the control 1*, by this target length change $\Delta L_{target}$ forward, as shown in FIG. 1b.

As can be seen, both the target length change $\Delta L_{target}$ and the target cross section change $\Delta Q_{target}$ are each positive, i.e. the two stamps 4, 5 were pushed further forward in the longitudinal direction and in the first cross direction respectively 11.1.

In this way, excessive shortening of the loaf 100 when forming into the strand 100' is avoided.

The basic data measuring device 20 can include further measuring devices, for example a temperature measuring device 16 in the bottom of the forming pipe channel 2.1, by means of which the outside temperature of the loaf 100 inserted in the form tube channel 2.1 can be determined, which is also an important parameter for the possible deformation of the loaf 100.

A volume measuring device 17 is usually integrated into the basic data measuring device 20, because the volume of the inner free space 7 in the form tube 2 between the loaf stop 13 and the longitudinal press stamp 4 can be calculated from the positions of the longitudinal press stamp 4 and the cross press stamp 5 in the pressed state.

From the positions of the press stamps 4, 5 in the unpressed state according to FIG. 1a when determining the length L and maximum thickness d of the loaf 100, this is only possible with additional knowledge of the weight of the respective loaf 100 and its specific weight, as the shape of the cross-section of the loaf 100 is not known with sufficient accuracy.

Without knowledge of the weight data, this would only be possible via an upstream, not shown, separate direct volume measuring device 17, such as a non-contact optical scanning of the cross-section of the loaf 100 over its entire length.

This would also lead to the fact that the target cross section $Q_{target}$ and thus the cross position of the cross press stamp 5 for pressing could be determined very precisely due to the target length change $\Delta L_{target}$.

As the pressing of the pressed loaf 100 should normally be carried out under a defined force, which should preferably be equal to the force applied to the stamps when cutting the loaf 100, the slicing machine 1 preferably also contains a force measuring device 14, with which at least the longitudinal pressing force can be determined. For this purpose, a corresponding force sensor 14 can be arranged at the loaf stop 13 as shown, or—not shown—at the stamp drive, which is the preferred solution, and then at both stamp drives, in order to be able to measure and control the forces applied to both stamps 4, 5.

Only for the sake of completeness, the subsequent automatic cutting of the strand 100' into slices 101, 102 is explained using FIGS. 2a-d:

For this purpose, the loaf 100, which is pressed to a strand 100', is pushed further forward by means of the longitudinal press stamp 4 with a feed force which preferably corresponds to the measuring force, namely beyond the cutting end 2a of the form tube 2 FIG. 2a, until the loaf 100 rests with its front end face against the stop plate 13, which is set to a corresponding distance A from the cutting end 2a of the form tube 2 (FIG. 2b), which determines the thickness of the slice to be cut off.

When in longitudinal direction 10 the position of the loaf 100 for cutting the next slice 101 is reached in this way, the blade 3 with its cutting edge 3a dips increasingly in the plunging direction, which here corresponds to the cross press direction 11.1, into the cross-section Q of the loaf 100 and cuts off a slice 102.

When the blade 3 is plunged by moving in the plunging direction, the stop plate 13 is also moved in the same cross direction (FIG. 2c), so that the cut-off slice 102 can tilt down over the upper edge, the functional edge, of the stop plate 13, which is positioned in a right angle to the longitudinal direction 10 and thus also inclined (FIG. 2d), and fall onto the discharge conveyor 8 located just below, which discharges it and then transfers it to another discharge conveyor 9.

One of the two conveyors, preferably the downstream conveyor 9, on which the previously separated slice 101 is still located, comprises a scale 18 for weighing the individual slices 101, 102. Their weight can be fed back to the control 1\* of machine 1 for automatic correction of the distance A and thus the weight of the following slices.

For the common movement, both the blade 3 and the stop plate 13 are mounted to a common carrier 22, which is mounted movably in the plunging direction 11.1 of the blade 3 on a—not shown—base frame of the cutting unit 6.

The stop plate 13 can be adjusted along the carrier 22 in the longitudinal direction 10 to change the distance A and thus the thickness of the slice to be cut off.

The carrier 22 can also be designed in two parts as shown and consist of a blade carrier 22a, by which the rotating blade 3 is supported, and a stop carrier 22b, at which the stop plate 13 is mounted so that it can be moved and adjusted in the longitudinal direction 10.

As the two carrier 22a, b are adjustable relative to each other, especially in the plunging direction 11.1, the gap considered in the longitudinal direction 10 between the cutting edge 3a of blade 3 and the functional edge, the upper edge, of the stop plate 13 can be adjusted depending, among other things, on the elasticity of the slices to be cut off.

LIST OF REFERENCE SIGNS

1 slicing machine
1\* control
2 form tube
2.1 form tube channel
2.1a, b side wall
2a cutting end
2b loading end
3 blade
3' blade axis
3" blade plane
3a cutting edge
4 longitudinal press stamp
4a, b longitudinal stamp part
5 cross-press stamp
6 cutting unit
7 internal space, form tube cavity
7a frontal face opening
8 conveyor
9 conveyor
10 Longitudinal pressing direction, axial direction, Feed direction
11.1 first cross press direction
11.2 second cross press direction
12, 12' piston rod
13 stop plate, loaf stop
14 force measuring device
15 thickness measuring device
16 temperature measuring device
17 volume measuring device
18 weight measuring device, weighing station
19 length measuring device
20 basic data measuring device
21 input unit
22 carrier
22a blade carrier
22b stop carrier
100 loaf
100' strand
101 slice
102 slice
A distance
d thickness
L, L' length
$\Delta L$ change of length
$\Delta L_{target}$ target length change
Q, Q' cross section
$\Delta Q$ cross section change
$\Delta Q_{target}$ target cross section change
V vertical

The invention claimed is:

1. A method of pressing an irregularly shaped, elongated loaf of an elastic material into a strand with a cross-section which is constant along a longitudinal extension of the strand, while changing a length and a cross-section of the loaf, in a slicing machine, the method comprising the following steps:
    disposing the loaf in a form tube of the slicing machine, the form tube having a same cross-section over a longitudinal extension of the form tube;
    determining basic data of the loaf before pressing, wherein the determining is performed in an automatic manner by means of a basic data measuring device of the slicing machine and/or via an input unit by an operator, the basic data comprising at least physical basic data of the loaf before pressing,
    determining a target length change of the loaf between an unpressed state and a pressed state by means of a control system of the slicing machine based on the basic data,
    determining a target cross-sectional change of the loaf between the unpressed state and the pressed state, which is necessary for deformation of the loaf into the strand, from the target length change and from the physical basic data of the loaf in an automatic manner by means of the control system, and
    pressing the loaf in the form tube in at least one cross direction to the longitudinal extension of the form tube by means of a cross press stamp and in a longitudinal pressing direction of the form tube by means of a longitudinal press stamp, according to the target length change and the target cross-sectional change.

2. The method according to claim 1, wherein the physical basic data of the loaf include at least
    length in the longitudinal pressing direction
    and
    weight or volume.

3. The method according to claim 1, wherein the physical basic
    data include
    data of the elastic material, regarding
    its physical properties,
    and/or
    frost condition of the loaf.

4. The method according to claim 1, wherein the basic data include a type of material of the loaf, and the target length change depends on the type of material of the loaf.

5. The method according to claim 4, wherein the material comprises a grown piece of meat, and the basic data include animal species of the material and place of origin of the material on an animal.

6. The method according to claim 1, wherein the target length change is between −30% and +10%, with reference to a length of the loaf before the step of pressing the loaf in the form tube.

7. The method according to claim 1, wherein the target length change of the loaf, with reference to a length of the loaf before the step of pressing the loaf in the form tube, is a positive value.

8. The method according to claim 1, wherein
one of the target length change and the target cross-sectional change has a positive value and the other of the target length change and the target cross-sectional change has a negative value,
or each of the target length change and the target cross-sectional change has a negative value.

9. The method according to claim 1, wherein
the step of pressing the loaf in the form tube comprises pressing the loaf in a first cross direction by a first cross press stamp, and transversely pressing the loaf in the form tube in a second cross direction, which is in perpendicular to the first cross direction, by a second cross press stamp, and wherein the method comprises the further following step before pressing the loaf:
automatically determining, for a pressed state of the second cross press stamp, a cross position by means of the control system from the basic physical data.

10. The method according to claim 1, further comprising:
determining, in a compressed state after pressing the loaf into the strand in the form tube, a length of the strand in a longitudinal pressing direction using the longitudinal press stamp that subjects the strand to a measuring force,
pushing the strand forward in the longitudinal pressing direction beyond a front cutting end of the form tube,
separating a slice from the strand in front of the front cutting end of the form tube by at least one blade, and
when the strand is cut, pushing the strand forward by the longitudinal press stamp with a force which is independent of the measuring force.

11. The method according to claim 1, wherein the basic data of the loaf include length in a longitudinal pressing direction and largest cross-section perpendicular to the length.

12. A method of pressing an irregularly shaped, elongated loaf of an elastic material into a strand with a cross-section which is constant along a longitudinal extension of the strand, while changing a length and a cross-section of the loaf, in a slicing machine, the method comprising:
receiving the loaf in a form tube of the slicing machine, the form tube having a same cross-section over a longitudinal extension of the form tube;
determining, before pressing the loaf in the slicing machine, basic data of the loaf in an automatic manner by a basic data measuring device of the slicing machine and/or receiving, before pressing the loaf in the slicing machine, the basic data via an input unit, the basic data comprising a first type and/or a second type different than the first type, wherein the first type comprises physical basic data of the loaf before pressing the loaf in the slicing machine;
determining a target length change of the loaf between an unpressed state and a pressed state by a control system of the slicing machine based on the basic data;
determining a target cross-sectional change of the loaf between the unpressed state and the pressed state from the target length change and from the physical basic data of the loaf in an automatic manner by the control system; and
pressing the loaf in the form tube in a cross direction to the longitudinal extension of the form tube by a cross press stamp and in a longitudinal pressing direction of the form tube by a longitudinal press stamp, according to the target length change and the target cross-sectional change.

13. The method according to claim 12, wherein the basic data include a type of material of the loaf, and the target length change is based on the type of material of the loaf.

14. The method according to claim 12, wherein the pressing the loaf in the form tube further comprises pressing the loaf in an additional cross direction by an additional cross press stamp, wherein the additional cross direction is perpendicular to the cross direction, and wherein the method further comprises, prior to the pressing the loaf in the form tube, automatically determining, for a pressed state of the additional cross press stamp, a cross position by the control system based on the basic physical data.

* * * * *